United States Patent
Domig et al.

(10) Patent No.: US 11,014,598 B2
(45) Date of Patent: May 25, 2021

(54) STEERING COLUMN COMPRISING AN ENERGY ABSORPTION DEVICE FOR A MOTOR VEHICLE

(71) Applicants: THYSSENKRUPP PRESTA AG, Eschen (LI); thyssenkrupp AG, Essen (DE)

(72) Inventors: Markus Domig, Bartholomäberg (AT); Gerhard Waibel, Bildstein (AT)

(73) Assignees: thyssenkrupp Presta AG, Eschen (LI); thysseukrupp AG, Essen (DE)

(*) Notice: Subject to any disclaimer, the term of this patent is extended or adjusted under 35 U.S.C. 154(b) by 87 days.

(21) Appl. No.: 16/340,998

(22) PCT Filed: Oct. 18, 2017

(86) PCT No.: PCT/EP2017/076613
§ 371 (c)(1),
(2) Date: Apr. 10, 2019

(87) PCT Pub. No.: WO2018/073305
PCT Pub. Date: Apr. 26, 2018

(65) Prior Publication Data
US 2020/0039570 A1    Feb. 6, 2020

(30) Foreign Application Priority Data

Oct. 19, 2016 (DE) .................... 10 2016 220 532.3

(51) Int. Cl.
*B62D 1/19* (2006.01)
(52) U.S. Cl.
CPC ............. *B62D 1/197* (2013.01); *B62D 1/192* (2013.01); *B62D 1/195* (2013.01)
(58) Field of Classification Search
CPC .......... B62D 1/19; B62D 1/192; B62D 1/195; B62D 1/197
See application file for complete search history.

(56) References Cited

U.S. PATENT DOCUMENTS

| | | | |
|---|---|---|---|
| 5,082,311 A * | 1/1992 | Melotik | B62D 1/195 188/371 |
| 5,615,916 A * | 4/1997 | Fujiu | B62D 1/195 188/374 |

(Continued)

FOREIGN PATENT DOCUMENTS

| | | |
|---|---|---|
| CN | 2709274 Y | 7/2005 |
| CN | 102099238 A | 6/2011 |

(Continued)

OTHER PUBLICATIONS

English Translation of International Search Report issued in PCT/EP2017/076613, dated Jan. 11, 2018.

*Primary Examiner* — Frank B Vanaman
(74) *Attorney, Agent, or Firm* — thysseaknipp North America, LLC

(57) ABSTRACT

A steering column may include an outer casing unit in which an inner casing tube that rotatably mounts a steering shaft is received such that the inner casing tube is displaceable and fixable in an axial direction. An energy absorption device operatively disposed between the casing tube and the casing unit may absorb at least some energy in a crash event where the casing tube is telescopically displaced relative to the casing unit. The energy absorption device may include a deformation strip fastened to but spaced apart from the casing tube, fixed in a radial direction by a spacer on the casing tube, to which deformation strip a deformation slide that is connected to the casing unit is disposed. The deformation slide may encompass and jam outer narrow sides of the deformation strip such that the deformation slide deforms the deformation strip in a crash event.

10 Claims, 2 Drawing Sheets

(56) References Cited

U.S. PATENT DOCUMENTS

| | | | |
|---|---|---|---|
| 2006/0181070 A1 | 8/2006 | Imamura | |
| 2009/0000417 A1* | 1/2009 | Oshita | B62D 1/192 74/493 |
| 2011/0210536 A1 | 9/2011 | Monteil | |
| 2012/0024101 A1* | 2/2012 | Schnitzer | B62D 1/195 74/492 |
| 2013/0068062 A1* | 3/2013 | Kircher | F16F 7/125 74/492 |
| 2016/0121920 A1* | 5/2016 | Klepp | B62D 1/195 74/492 |
| 2017/0008550 A1 | 1/2017 | Huber | |

FOREIGN PATENT DOCUMENTS

| | | | |
|---|---|---|---|
| CN | 203511751 U | 4/2014 | |
| DE | 102011015140 A | 9/2012 | |
| DE | 102014104354 B | 4/2015 | |
| DE | 10 2014 101 631 B | 6/2015 | |
| DE | 102015207230 B | 3/2016 | |
| DE | 102015204894 A | 9/2016 | |
| JP | 2008-24170 * | 2/2008 | B62D 1/19 |
| WO | 2014048535 A | 4/2014 | |
| WO | 2016142482 A | 9/2016 | |

\* cited by examiner

STEERING COLUMN COMPRISING AN ENERGY ABSORPTION DEVICE FOR A MOTOR VEHICLE

CROSS REFERENCE TO RELATED APPLICATIONS

This application is a U.S. National Stage Entry of International Patent Application Serial Number PCT/EP2017/076613, filed Oct. 18, 2017, which claims priority to German Patent Application No. DE 10 2016 220 532.3, filed Oct. 19, 2016, the entire contents of both of which are incorporated herein by reference.

FIELD

The present disclosure generally relates to steering columns, including motor vehicle steering columns with energy absorption devices.

BACKGROUND

A steering column for a motor vehicle is known from DE 10 2011 015 140 A1, for example. A deformation slide that serves as a brake in the crash event is pulled over the deformation strip which herein is squeezed and deformed. The deformation strip has a raised web which guarantees that the deformation strip is spaced apart from and supported on the casing tube, and in the crash event prevents that the deformation strip flexes and is pushed out of the deformation slide. The configuration of the web on the deformation strip is undesirable since said web compromises the freedom of design in the construction of the deformation strip.

Thus a need exists for a steering column for motor vehicles that may comprise an energy absorption device that provides an alternative support of an deformation strip.

DETAILED DESCRIPTION

Figure 1:
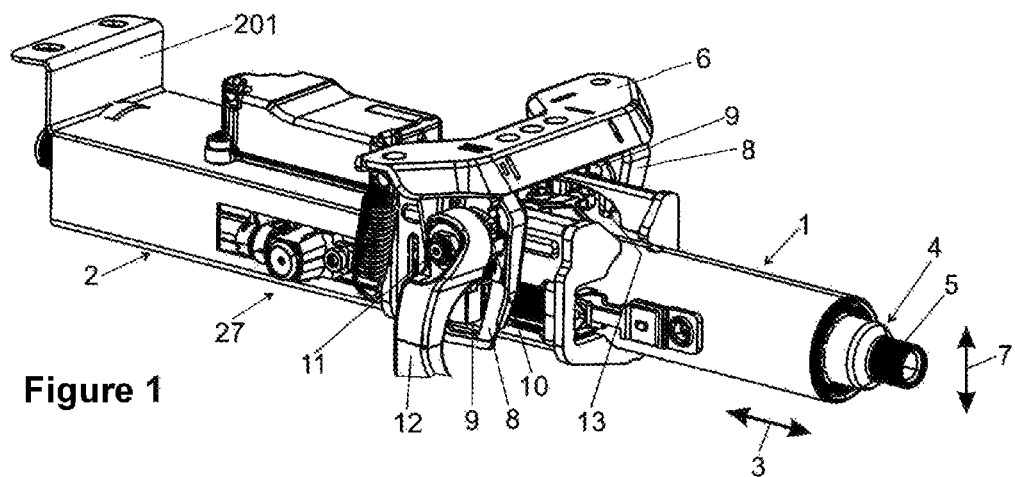
FIG. 1 is a perspective view of an example steering column having a variably switchable energy absorption device.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a steering column for a motor vehicle may include an inner casing tube that rotatably mounts a steering shaft, and an outer casing unit that is capable of being connected to a vehicle chassis and in which the inner casing tube is received so as to be displaceable and fixable in an axial direction. The steering column may include an energy absorption device that is operatively disposed between the casing tube and the casing unit and in which part of the energy arising in the event of a crash is capable of being absorbed when the casing tube is telescopically displaced in relation to the casing unit. The energy absorption device may comprise a deformation strip that is fastened to the casing tube and on which a deformation slide that is connected to the casing unit is disposed. The deformation slide may encompass and jam the outer narrow sides of the deformation strip such that the deformation slide deforms the deformation strip when the deformation strip in the crash event is displaced in the axial direction relative to the deformation slide.

In some examples, the deformation strip is held so as to be spaced apart from the casing tube and fixed in the radial direction by at least one spacer that is disposed on the casing tube.

The or each spacer is preferably designed as a radial convexity of the casing tube that from the casing tube protrudes in the direction of the at least one deformation strip. Said convexity can also be referred to as a protrusion. This renders the separate production of the spacer and the attachment to the casing tube redundant. The convexity and the casing tube are preferably configured as a single-part, integral component.

The or each convexity is advantageously designed as a roller-burnished feature that is incorporated from the internal side of the casing tube. On account thereof, the convexity can be molded in the casing tube in a simple and cost-effective manner.

In a first advantageous embodiment of the invention the spacer is designed as a web that is aligned in the axial direction. Only a single spacer is required in the case of this embodiment.

It is particularly advantageous for the spacer to extend in the axial direction across the deformable region of the deformation strip. On account thereof, any flexing of the deformation strip and any slipping from the deformation slide is prevented across the entire deformable longitudinal region.

A second advantageous embodiment provides that a plurality of spacers that are disposed so as to be distributed across the deformable longitudinal region of the deformation strip are provided on the casing tube. Any flexing of the deformation tube and any slipping from the deformation slide can also be effectively prevented by a plurality of spacers.

In the case of a further advantageous exemplary embodiment of the invention, two deformation strips are provided, wherein a lower deformation strip is disposed directly on the casing tube, and an upper deformation strip is disposed on the lower deformation strip. In order for any flexing of the upper deformation strip and any slipping from the associated deformation slide to be prevented, the lower deformation strip is provided with at least one protrusion that projects in the direction of the upper deformation strip. This projecting protrusion of the lower deformation strip keeps the upper deformation strip at a spacing, fixes said upper deformation strip in the radial direction, and guarantees the flawless functioning of the energy absorption device. The lower deformation strip herein is configured so as to be wider than the upper deformation strip, and a first deformation slide that is disposed on the upper deformation strip is narrower than a second deformation slide that is disposed on the lower deformation strip, wherein the second deformation slide encompasses both deformation strips but jams only the lower deformation strip, and the first deformation slide encompasses and jams only the upper deformation strip.

The at least one protrusion can advantageously be molded in the lower deformation strip. A simple operative step suffices to this end.

In a first advantageous variant of the exemplary embodiment of the invention the protrusion is designed in the manner of a web. On account thereof, a mutual spacing of the two deformation strips and the fixing of the latter is guaranteed across a large longitudinal region.

It is particularly advantageous for the web-type protrusion to extend across the deformable longitudinal region of the lower deformation strip. The flawless functioning across the entire deformation region is guaranteed on account thereof.

In a second variant of the exemplary embodiment of the invention, a plurality of protrusions that are disposed so as to be distributed across the deformable longitudinal region of the lower deformation strip are provided on the latter. This variant is recommended when a web-type protrusion that extends across the entire deformable longitudinal region cannot be considered for reasons of construction technology.

An advantageous design embodiment of the invention furthermore provides that the at least one deformation slide is connected to the outer casing unit by a rack plate, wherein an arrestor element that is provided with teeth is connected to the outer casing unit by a tightening device which pushes the arrestor element against the rack plate so as to in the driving operation fix the latter immovably on the casing unit such that a displacement of the casing tube in relation to the casing unit in the crash event is possible only by the activation of the energy absorption device. This assembly requires particularly little installation space.

The arrestor element being pushed against the rack plate is to be understood in that the arrestor element and the rack plate are mutually engaged. To this end, it is not necessary for a force to pre-tension the arrestor element in the direction of the rack plate.

The tightening device can preferably comprise a first lifting disk and a second lifting disk, wherein the first lifting disk is connected in a rotationally fixed manner to an activation lever and a tensioning bolt and interacts with the second lifting disk, wherein in a rotation of the first lifting disk in relation to the second lifting disk by means of the activation lever a clamping stroke is provided in the direction of the tensioning axis. The second lifting disk is coupled to the arrestor part. The first lifting disk preferably comprises a cam portion. The second lifting disk preferably comprises a cam track contour which can interact with the cam portion.

The tightening device by means of an activation lever is either tightened or released, also referred to as the fixing position and the releasing position. In the released state (releasing position) of the tightening device, the casing tube can be telescoped in relation to the casing unit, on the one hand. In the tensioned state (fixing position), the casing tube is blocked in relation to the casing unit such that a displacement of the casing tube in relation to the casing unit is possible only when a force which exceeds a predetermined breakaway force is introduced into the steering shaft. In other words, in the crash event the casing tube can telescope into the casing unit while energy is absorbed by the energy absorption device. The tightening device in the normal operation is in the fixing position in which the adaptation of the steering shaft position, that is to say the adjustment of the casing tube in relation to the casing unit, is prevented.

In one embodiment, as an alternative to a manual adjustment, it is possible that the casing tube and the casing unit are capable of being mutually telescoped by means of a motorized drive. The fixing capability of the casing tube in the relation to the casing unit is implemented by the stand-still of the motorized drive, and in one advantageous embodiment is implemented by a self-locking gear mechanism.

In FIG. 1 shows a steering column according to the invention, in which an inner casing tube 1 is mounted in an outer casing unit 2 so as be longitudinally displaceable in the axial direction 3. A steering shaft 4 is rotatably mounted in the casing tube 1, a steering wheel (not shown) being able to be assembled on the end 5 of said steering shaft 4 that faces the driver of the motor vehicle. The casing unit 2 is capable of being connected to the vehicle chassis (not shown) by way of a holder 6. The holder 6 is fixedly screw-fitted to the vehicle chassis, while the casing unit 2 is mounted so as to be pivotable in the vertical direction 7 in relation to the holder 6. The casing unit 2 comprises a fastening portion 201 which is capable of being connected to the vehicle chassis and is elastically deformed by an adjustment in the vertical direction 7.

The holder 6 for the pivotable mounting is provided with two clamping jaws 8 which encompass the casing unit 2 and which comprise vertical slots 9. A tightening device 10 is provided with a tensioning bolt 11 which passes through the vertical slots 9 of the clamping jaws 8 and through two bores 13 of the casing unit 2. The tightening device 10 comprises a first lifting disk 101, configured as a cam disk, and a second lifting disk 102, configured as a cam track disk, wherein the second lifting disk has a cam track 103. The first lifting disk 101 is connected in a rotationally fixed manner to an activation lever 12 and the tensioning bolt 11. The tightening device 10, by means of the activation lever 12, is either tightened or released in that the first lifting disk 101 in relation to the second lifting disk 102 is rotated about the axis of the tensioning bolt 11. In the released state (releasing position) of the tightening device 10, the casing tube 1 can be displaced in the axial direction 3 in relation to the casing unit 2, on the one hand, and the casing unit 2 can be pivoted in the vertical direction 7 in relation to the holder 6, on the other hand. On account thereof, a longitudinal adjustment of the steering wheel in the axial direction 3 and a height adjustment of the steering wheel in the vertical direction 7 are enabled. In the tightened state (fixing position) of the tightening device 10, the casing tube 1 is tightly clamped in the casing unit 2 and the casing unit 2 is also tightly clamped in the holder 6 such that the steering column is fixed and a height adjustment or longitudinal adjustment of the steering wheel is no longer possible.

Figure 2:
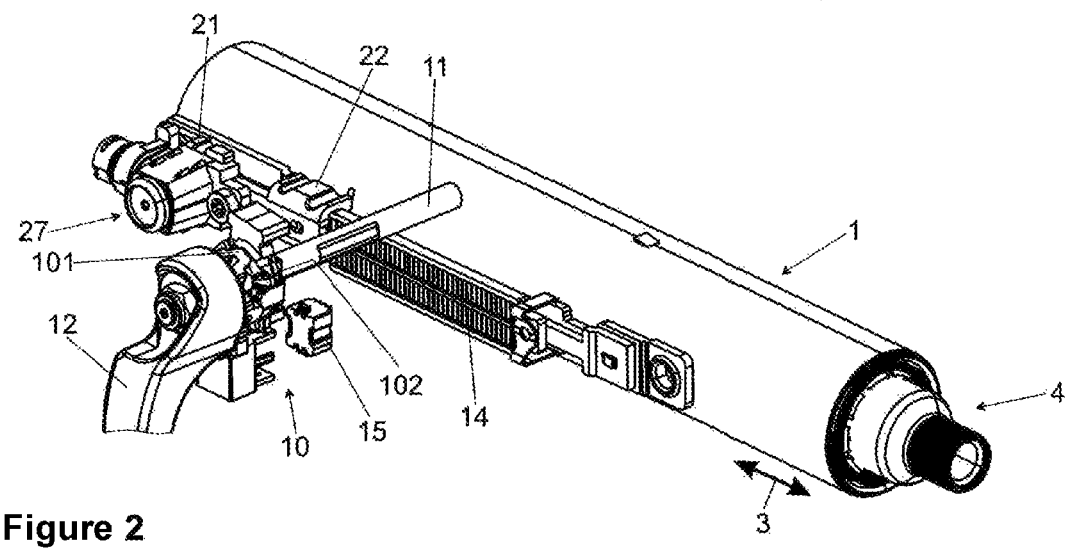
FIG. 2 is a perspective view of an example inner casing tube with an example energy absorption device.

As can best be seen in FIG. 2, the casing tube 1 is provided with a rack plate 14 that is aligned in the axial direction 3. An arrestor element 15 which is capable of being pushed against the rack plate 14 by the tightening device 10 is likewise provided with teeth. When the arrestor element 15 in the tightened state of the tightening device 10 is pressed against the rack plate 14, the teeth of the arrestor element 15, which is operatively connected to the second lifting disk 102, mesh with the teeth of the rack plate 14 such that the rack plate 14 is fixed so as to be immovable in relation to the holder 6. A displacement of the rack plate 14 in relation to the holder 6 in the axial direction 3 is no longer possible in this instance.

In order for the casing tube 1 in the normal operation of the vehicle to be displaced in the axial direction 3 in relation to the casing unit 2, the tightening device 10 has to be released by way of the activation lever 12, that is to say transferred from the fixing position to the releasing position, wherein the arrestor element 15 is raised from the rack plate 14 and a displacement of the rack plate 14 in the axial direction 3 in relation to the arrestor element 15 is possible. The arrestor element 15 per se cannot be displaced in the axial direction 3 in relation to the holder 6 and the casing unit 2, since the tensioning bolt 11 is prevented from such a displacement by the vertical slots 9. However, the tensioning bolt 11 can be displaced in the vertical direction 7 in the vertical slots 9. On account thereof, the casing unit 2, conjointly with the casing tube 1 disposed therein, is pivoted in the vertical direction 7. The tightening device 10, conjointly with the tensioning bolt 11, the activation lever 12, and the arrestor element 15 is also pivoted collectively with the casing tube 1 and the casing unit 2 in the vertical direction 7 such that arrestor element 15 at all times remains in the region of the rack plate 14.

Figure 3:
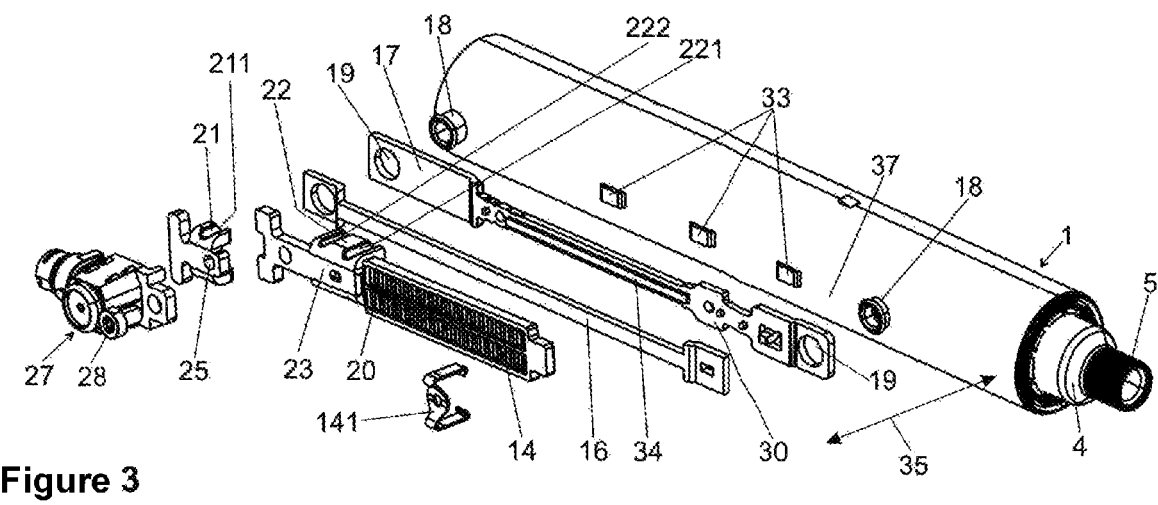
FIG. 3 is an exploded view of an example energy absorption device on a casing tube.

As can best be seen in FIG. 3, two deformation strips 16, 17 which are aligned in the axial direction 3 are disposed on the casing tube 1, wherein an upper deformation strip 16 is disposed on top of a lower deformation strip 17. The lower deformation strip 17 is disposed directly on the casing tube 1. For fastening to the casing tube 1, the latter is provided with fastening elements 18 which protrude beyond the surface of the casing tube 1 and through corresponding openings 19 at the ends of the deformation strips 16, 17.

The rack plate 14, at the end 20 thereof that lies in the travel direction of the vehicle, is connected to two deformation slides 21, 22, wherein a first deformation slide 21 is capable of being decoupled. A coupling rail 23 connects the end 20 of the rack plate 14 to the two deformation slides 21, 22, wherein the connection to the second deformation slide 22 is fixed, and the connection to the first deformation slide 21 is designed so as to be capable of being decoupled. The rack plate 14 and the second deformation slide 22 are configured as a single-part integral component. The rack plate 14 and the second deformation slide 22 can be configured as a formed component or else as a sintered component. A clamping spring 141 serves as a downholding element and, on the side facing away from the first deformation slide 22, fastens the rack plate 14 to the second deformation strip 17 such that any radial raising of the rack plate 14 in the crash event is prevented. The coupling of the first deformation slide 21 to the coupling rail 23 is performed by means of a coupling bolt 24 (not shown) which is capable of being introduced into a bore 25 of the first deformation slide 21. A pyrotechnical switch 27 is fastened by means of a fastening bolt 28 in a bore 26 of the coupling rail 23. The coupling bolt in the normal case protrudes through the bore 25 of the first deformation slide 21. The coupling bolt can be pulled out of the bore 25 of the first deformation slide 21 by activating the pyrotechnical switch 27, such that the first deformation slide 21 is decoupled from the coupling rail 23.

For example, when the driver in the crash event impacts the steering wheel, very high forces in the travel direction, which can cause a displacement of the casing tube 1 in the axial direction 3 in relation to the casing unit 2, act on the steering wheel and thus on the steering shaft 4 and the casing tube 1. Since the rack plate 14 by way of the arrestor element 15, by means of the tightening device 10, is connected in an immovable manner to the casing unit 2, said rack plate 14 cannot move in the axial direction 3. The same applies to the second deformation slide 22 which is non-releasably connected to the rack plate 14, and also applies to the first deformation slide 21 when the latter by way of the pyrotechnical switch 27 and the coupling bolt is connected to the coupling rail 23. When the casing tube 1 in the crash event is forcibly displaced by a high force in the axial direction 3 in relation to the casing unit 2, said casing tube 1 entrains the two deformation strips 16, 17 which are fixedly connected to the casing tube 1. On the other hand, since the two deformation slides 21, 22 cannot be displaced in relation to the casing unit 2, said two deformation slides 21, 22 are pulled over the associated deformation strips 16, 17 and herein deform the latter. The deformation energy that has to be generated for the deformation of the deformation strips 16, 17 is thus absorbed from the kinetic energy. The casing tube 1, and the impacting driver by way of the steering shaft 4 and the steering wheel, herein are decelerated to the extent that kinetic energy is absorbed in both deformation strips 16, 17.

When other circumstances, for example because the driver is secured by the safety belt, arise in the crash event, the impact on the steering wheel will thus be less hard, and less energy will have to be absorbed by the energy absorption device. In this case, the pyrotechnical switch 27 which pulls the coupling bolt out of the bore 25 of the first deformation slide 21 is activated. When the casing tube 1 in this case is again displaced by the forces arising in the crash event in the axial direction 3 in relation to the casing unit 2, the decoupled first deformation slide 21 is not moved but remains at the position assumed by said deformation slide 21 prior to the crash. Only the second deformation slide 22 which is non-releasably connected to the coupling rail 23 is pulled over the second deformation strip 17.

In this case, only the lower deformation strip 17 is thus deformed; the upper deformation strip 16 remains non-deformed. Less deformation energy is required for the deformation of a single deformation strip 17 than in the other case in which two deformation strips 16, 17 have to be deformed. Therefore, the deformation of a single deformation strip 17 also absorbs less kinetic energy than the deformation of two deformation strips 16, 17. The activation of the pyrotechnical switch 27 prior to the displacement of the casing tube 1 in relation to the casing unit 2 consequently leads to less kinetic energy being absorbed by the energy absorption device according to the invention in the displacement in the axial direction 3 than in the case without the activation of the pyrotechnical switch 27. The kinetic energy absorbed in the crash event can therefore be adapted to the respective prevailing circumstances of the crash event.

The adaptive energy absorption device according to the invention requires only very little installation space because the deformation strips 16, 17 and the rack plate 14 are disposed directly on top of one another on the same side of the surface of the casing tube 1. In order for the first deformation slide 21 to deform only the upper deformation strip 16, and for the second deformation slide 22 to deform only the lower deformation strip 17, the lower deformation strip that lies closer to the casing tube 1, transversely to the axial direction 3, is designed so as to be somewhat wider than the upper deformation strip 16. The first deformation slide 21 by way of the short flanks thereof comprises only the upper deformation strip 16. The short flanks of the first deformation slide 21 herein jam the narrow sides of the upper deformation strip 16 so firmly that said narrow sides deform the upper deformation strip 16 as soon as the first deformation slide 21 is pulled in the axial direction 3 over the upper deformation strip 16.

The second deformation slide 22, transversely to the axial direction 3, is designed so as to be wider, and the longer flanks thereof reach the wider lower deformation strip 17 lying below the upper deformation strip 16 such that the second deformation slide 22 by way of the longer flanks thereof jams the narrow sides of the lower deformation strip 17 so firmly that said second deformation slide 22 deforms the lower deformation strip 17 as soon as the second deformation slide 22 is pulled over the lower deformation strip 17.

The second deformation slide 22 herein also comprises the upper deformation strip 16. However, since the second deformation slide 22 is wider than the first deformation slide 21, the flanks of the second deformation slide 22 do not embrace the narrow sides of the upper deformation strip 16. The upper deformation strip 16 is therefore not deformed when the second deformation slide 22 is pulled in the axial direction 3 over the former.

The first deformation slide 21 comprises bolt-type protrusions 211 which interact with the narrow sides of the deformation strip 16 and deform the latter in the case of a relative movement. The protrusions are mutually spaced apart, wherein the spacing between the protrusions is less than the width of the deformation strip 16, that is to say the width of the narrow sides of the deformation strip 17. The bolt-type protrusions can comprise a radiused surface.

The second deformation slide 22 comprises a first pair of bolt-type protrusions 221 and a second pair of bolt-type protrusions 222, said bolt-type protrusions 221, 222 interacting with the narrow sides of the deformation strip 17 and deforming the latter. The protrusions 221, and the protrusions 222, respectively, are mutually spaced apart, wherein the spacing between the protrusions 221, and the protrusions 222, respectively, is less than the width of the deformation strip 17, that is to say the width of the narrow sides of the deformation strip 17. The bolt-type protrusions 221 and the bolt-type protrusions 222 comprise a radiused surface. It can be provided that the mutual spacing of the second protrusions 222 is less than, equal to, or larger than the mutual spacing of the first protrusions 221. The crash properties can be set in terms of construction on account thereof.

Figure 4:
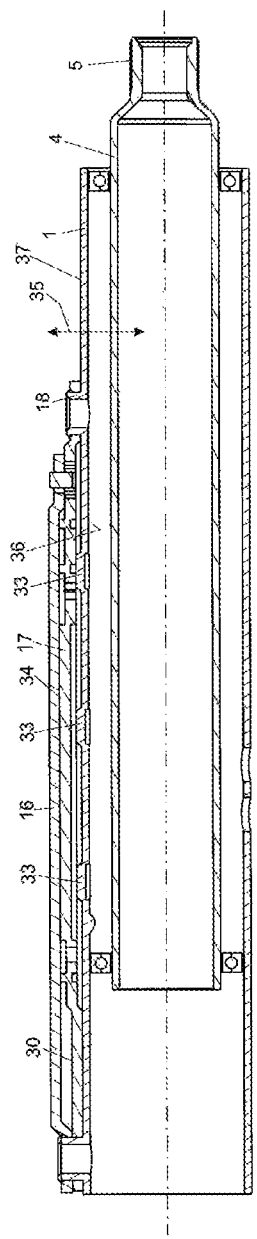
FIG. 4 is a sectional view of an example casing tube with parts of an energy absorption device.
Figure 5:
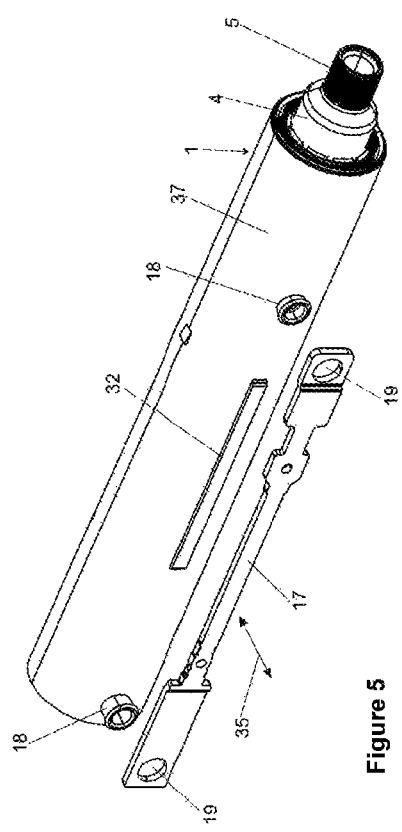
FIG. 5 is a perspective view of another example casing tube having parts of an energy absorption device.

As can best be seen in FIGS. 3 to 5, one or a plurality of spacers 32, 33 are disposed on the casing tube 1. In the case of the embodiment shown in FIG. 5, a web-shaped spacer 32 extends across the deformable longitudinal region of the deformation strip 17, said deformable longitudinal region in the assembled state bearing directly on the spacer 32 and being fixed in the radial direction 35 by the latter. On account thereof, the deformation strip 17 cannot flex in such a manner. The casing tube 1 illustrated in FIG. 5 is equipped with only a single deformation strip 17. The web-shaped spacer 32 is configured so as to be integral to the casing tube 1. Alternatively, it is likewise conceivable and possible that said spacer 32 is configured as a separate part, for example from plastics material, and is fastened to the casing tube 1 by means of fixing elements such as clips.

The embodiment illustrated in FIGS. 3 and 4 has the same effect as the embodiment illustrated in FIG. 5, wherein a plurality of spacers 33 which are disposed so as to be distributed in a mutually spaced-apart manner across the deformable longitudinal region of the lower deformation strip 17 are provided on the casing tube 1 in FIGS. 3 and 4.

In the two embodiments mentioned, the spacers 32, 33 have been molded in the casing tube 1 by roller-burnishing from the internal side 36, such that said spacers 32, 33 appear as convexities 32, 33 of the external side 37 of the casing tube 1.

As can be seen in FIGS. 3 and 4, the lower deformation strip 17 on the upper side 30 thereof that faces the deformation strip 16 is provided with a web-type protrusion 34 which serves as a spacer between the deformation strips 16, 17. On account of this measure is it possible for the two deformation strips 16, 17 to be disposed directly on top of one another. This enables a particularly compact construction mode. It is ensured by the protrusion 34 that the deformation strips 16, 17 cannot flex in such a manner that said deformation strips 16, 17 slip out of the respective deformation slide 21, 22. Moreover, a space for the deformations of the narrow sides of the deformation strips 16, 17 is thus made available such that mutual impediments of the functions of said deformation strips 16, 17 are avoided. In one embodiment (not shown) the protrusion 34 of the deformation strip 17 can also be configured as a plurality of spacers, for example as individual studs which are molded in the deformation strip.

The invention permits a particularly compact construction mode which is associated with lower production costs and nevertheless guarantees a reliable functioning of the energy absorption device.

LIST OF REFERENCE SIGNS

1 Casing tube
2 Casing unit
3 Axial direction
4 Steering column
5 End
6 Holder
7 Vertical direction
8 Clamping jaws
9 Vertical slots
10 Tightening device
11 Tensioning bolt
12 Activation lever
13 Bore
14 Rack plate
15 Arrestor element
16 Upper deformation strip
17 Lower deformation strip
18 Fastening element
19 Opening
20 End
21 First deformation slide
22 Second deformation slide
23 Coupling rail
24
25 Bore
26 Bore
27 Switch
28 Fastening bolt
29 Lower side
30 Upper side
31
32 Spacer/convexity
33 Spacer/convexity
34 Protrusion
35 Radial direction
36 Internal side
38 External side

What is claimed is:

1. A steering column for a motor vehicle comprising:
   an inner casing tube that rotatably mounts a steering shaft;
   an outer casing unit that is connectable to a vehicle chassis, wherein the outer casing unit receives the inner casing tube such that the inner casing tube is displaceable and fixable in an axial direction; and
   an energy absorption device operatively disposed between the inner casing tube and the outer casing unit, wherein the energy absorption device is configured to absorb at least some energy arising in a crash event when the inner casing tube is telescopically displaced relative to the outer casing unit, wherein the energy absorption device comprises a deformation strip that is fastened to the inner casing tube such that the deformation strip is spaced apart from the inner casing tube and is fixed in a radial direction by a spacer disposed on the inner casing tube, wherein a deformation slide that is connected to the outer casing unit is disposed on the deformation strip, wherein the deformation slide encompasses and jams outer narrow sides of the deformation strip such that the deformation slide deforms the deformation strip when the deformation strip is displaced in a crash event in the axial direction relative to the deformation slide,
   wherein the spacer is configured as a radial convexity of the inner casing tube that protrudes from the inner casing tube in a direction of the deformation strip,
   wherein the radial convexity is configured as a roller-burnished feature that is incorporated from an internal side of the inner casing tube.

2. The steering column of claim 1 wherein the spacer extends in the axial direction.

3. The steering column of claim 2 wherein the spacer extends in the axial direction across a deformable longitudinal region of the deformation strip.

4. The steering column of claim 1 wherein the spacer is one of a plurality of spacers that are disposed on the inner casing tube and distributed across a deformable longitudinal region of the deformation strip.

5. The steering column of claim 1 wherein the spacer and the inner casing tube is a one-piece construction.

6. A steering column for a motor vehicle comprising:
   an inner casing tube that rotatably mounts a steering shaft;
   an outer casing unit that is connectable to a vehicle chassis, wherein the outer casing unit receives the inner casing tube such that the inner casing tube is displaceable and fixable in an axial direction; and
   an energy absorption device operatively disposed between the inner casing tube and the outer casing unit, wherein the energy absorption device is configured to absorb at least some energy arising in a crash event when the inner casing tube is telescopically displaced relative to the outer casing unit, wherein the energy absorption device comprises a deformation strip that is fastened to the inner casing tube such that the deformation strip is spaced apart from the inner casing tube and is fixed in a radial direction by a spacer disposed on the inner casing tube, wherein a deformation slide that is connected to the outer casing unit is disposed on the deformation strip, wherein the deformation slide encompasses and jams outer narrow sides of the deformation strip such that the deformation slide deforms the deformation strip when the deformation strip is displaced in a crash event in the axial direction relative to the deformation slide,
   wherein the deformation strip is a lower deformation strip and the deformation slide is a first deformation slide, the steering column comprising an upper deformation strip disposed on the lower deformation strip that is disposed on the inner casing tube, wherein the lower deformation strip includes a protrusion that projects in a direction of the upper deformation strip, wherein the lower deformation strip is wider than the upper deformation strip, wherein a second deformation slide that is disposed on the upper deformation strip is narrower than the first deformation slide disposed on the lower deformation strip, wherein the first deformation slide encompasses both of the deformation strips but jams only the lower deformation strip, wherein the second deformation slide encompasses and jams only the upper deformation strip.

7. The steering column of claim 6 comprising protrusions distributed across a deformable longitudinal region of the lower deformation strip.

8. The steering column of claim 6 wherein a protrusion is molded in the lower deformation strip.

9. The steering column of claim 8 wherein the protrusion is configured as a web.

10. The steering column of claim 9 wherein the protrusion extends across a deformable longitudinal region of the lower deformation strip.

* * * * *

UNITED STATES PATENT AND TRADEMARK OFFICE
CERTIFICATE OF CORRECTION

| | | |
|---|---|---|
| PATENT NO. | : 11,014,598 B2 | Page 1 of 1 |
| APPLICATION NO. | : 16/340998 | |
| DATED | : May 25, 2021 | |
| INVENTOR(S) | : Domig et al. | |

It is certified that error appears in the above-identified patent and that said Letters Patent is hereby corrected as shown below:

On the Title Page

Item (73) "Assignees", thysseukrupp AG should read thyssenkrupp AG.

Item (74) "Attorney, Agent or Firm", thysseaknipp North America, LLC should read thyssenkrupp North America, LLC.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*